United States Patent Office 3,457,223
Patented July 22, 1969

---

3,457,223
POLY-p-CARBORANYLENESILOXANES
Stelvio Papetti, Hamden, Conn., assignor to Olin Mathieson Chemical Corporation, a corporation of Virginia
No Drawing. Filed Oct. 30, 1967, Ser. No. 679,225
Int. Cl. C08g 31/32, 33/18
U.S. Cl. 260—46.5         3 Claims

ABSTRACT OF THE DISCLOSURE

Poly-p-carboranylenesiloxanes having the formula

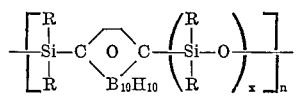

wherein R is an independently selected alkyl or aryl, $x$ is 1, 2 or 3 and $n$ is an integer greater than 1, are provided by the reaction of a 1,12-bis[alkoxydialkyl(or diaryl)silyl]-p-carborane with a 1,12-bis[halodialkyl(or diaryl)silyl]-p-carborane, a dihalodialkyl(or diaryl)silane and a tetraalkyl(or tetraaryl) dihalodisiloxane respectively. These polymers are useful in the preparation of high temperature resistant composites suitable for use as gaskets, bushings, etc.

---

The invention herein described was made in the course of or under a contract or subcontract thereunder, with the Department of the Navy.

This invention relates to poly-p-carboranylenesiloxanes having the formula

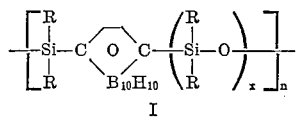

I wherein R is an independently selected alkyl or aryl, $x$ is 1, 2 or 3 and $n$ is an integer greater than 1.

Various polycarboranylenesiloxanes have been previously prepared and reported in the literature. Thus, S. Papetti et al. in J. Polymer Science, Part A–1, 4, 1623–1636 (1966) disclose the preparation of the meta isomers of polymers I where R is methyl and $x$ is 1, 2 or 3 by reacting 1,7-bis-(methoxydimethylsilyl)-m-carborane with 1,7-bis-(chlorodimethylsilyl)-m-carborane, dichlorodimethylsilane and tetramethyldichlorodisiloxane respectively.

Now it has been found that poly-p-carboranylenesiloxanes I can be provided by employing appropriate p-carborane containing compounds in the previously described reaction. The poly-p-carboranylenesiloxanes I of this invention possess surprisingly different properties from their meta isomers and are therefore suitable for use in different important industrial applications.

The poly-p-carboranlyenesiloxanes I where $x$ is 1 are provided by the condensation of a 1,12-bis[halodialkyl(or diaryl)silyl]-p-carborane with a 1,12-bis[alkoxydialkyl(or diaryl)silyl]-p-carborane in accordance with the following equation where R is alkyl or aryl and X is halogen.

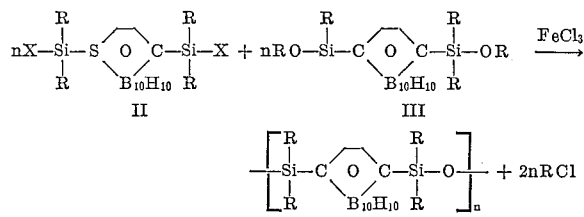

1,12-bis[halodialkyl(or diaryl)silyl]-p-carboranes having the Formula II are readily provided according to the process described by S. Papetti et al. in Inorg. Chem. 3, 1448 (1964) for the preparation of 1,7-bis(chlorodimethyl-silyl)-m-carborane. Thus, p-carborane is first reacted with an alkali metal alkyl or alkali metal aryl to provide dialkali metal p-carborane. Suitable alkali metal alkyls and alkali metal aryls include methyllithium, ethylsodium, isopropylpotassium, n-butyllithium, phenyllithium, etc. The dialkali metal p-carborane is then reacted with an appropriate dialkyldihalosilane or diaryldihalosilane to provide the desired 1,12-bis[halodialkyl(or diaryl)silyl]-p-carborane II. A temperature between about −90° and +50° C. is generally employed and preferably an inert diluent such as diethyl ether, ethylene glycol, dioxane, etc. is utilized in the preparation of 1,12-bis-[halodialkyl(or diaryl) silyl]-p-carborane II from p-carborane.

Exemplificative 1,12-bis[halodialkyl(or diaryl)silyl]-p-carboranes suitable for use in the preparation of poly-p-carboranylenesiloxanes I where $x$ is 1 include 1,12-bis-chlorodimethylsilyl)-p-carborane; 1,12-bis(chlorodiethylsilyl) - p-carborane; 1,12 - bis(chloromethylethylsilyl)-p-carborane; 1,12-bis(chlorodi-n-propylsilyl)-p-carborane; 1,12-bis(chlorodiisoamylsilyl)-p-carborane; 1,12-bis(chlorodi-n-octylsilyl)-p-carborane; 1,12 - bis(chlorodiphenyl-silyl)-p-carborane; 1,12 - bis(chloroditolylsilyl)-p-carborane; 1,12-bis(chlorodixylylsilyl)-p-carborane and the corresponding bromine, iodine and fluorine derivatives.

1,12 - bis[alkoxydialkyl(or diaryl)silyl - p - carboranes having the Formula III are provided by reacting the previously described 1,12-bis[halodialkyl(or diaryl)silyl]-p-carboranes II with an appropriate alcohol according to the process described by S. Papetti et al. in Inorg. Chem. 3, 1448 (1964). Suitable alcohols include methanol, ethanol, n-propanol, n-butanol, etc. Generally the reaction is carried out at a temperature between about −10° to +175° C. and optionally an inert solvent may be employed.

Illustrative 1,12 - bis[alkoxydialkyl(or diaryl)silyl]-p-carboranes III which can be employed in the preparation of the poly-p-carboranylenesiloxanes I where $x$ is 1 include 1,12-bis(methoxydimethylsilyl)-p-carborane; 1,12-bis(methoxydiethylsilyl)-p-carborane; 1,12-bis(methoxymethylethylsilyl)-p-carborane; 1,12 - bis(ethoxydipropyl-silyl)-p-carborane; 1,12 - bis(ethoxydimethylsilyl)-p-carborane; 1,12-bis(ethoxyethylisopropylsilyl)-p-carborane; 1,12-bis(n-butoxydimethylsilyl) - p - carborane; 1,12-bis (methoxydi-n-butylsilyl)-p-carborane; 1,12-bis(methoxy-di-n-hexylsilyl)-p-carborane; 1,12-bis(methoxydiphenyl-silyl)-p-carborane; 1,12 - bis(methoxyditolylsilyl)-p-carborane; 1,12-bis(methoxydixylylsilyl)-p-carborane and the like.

Poly-p-carboranylenesiloxanes I where $x$ is 2 are prepared by the ferric chloride catalyzed condensation of a 1,12-bis[alkoxydialkyl(or diaryl)silyl]-p-carborane III with a dihalodialkyl(or diaryl)silane in accordance with the followng equation where R and X are as previously described.

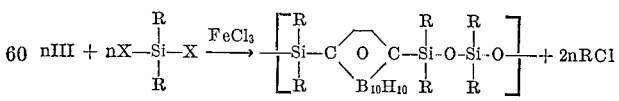

Dihalodialkyl(or diaryl)silanes suitable for use in this reaction include dimethyldichlorosilanes, diethyldichlorosilane, ethylmethyldichlorosilane, diamyldichlorosilane, dihexyldichlorosilane, diphenyldichlorosilane, ditolyldichlorosilane, dixylyldichlorosilane, etc.

Where a poly-p-carboranylenesiloxane I where $x$ is 3 is desired, a tetraalkyl(or tetraaryl)dihalodisiloxane is condensed with one of the previously described 1,12-bis[alkoxydialkyl(or diaryl)silyl]-p-carboranes III in accordance with the following equation where R is alkyl and X is halogen.

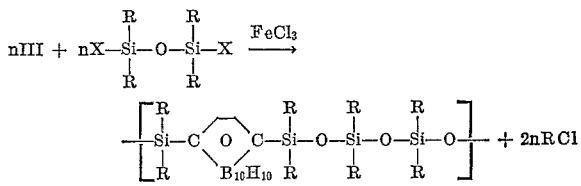

Suitable tetraalkyl(or tetraaryl)dihalodisiloxanes include tetramethyldichlorodisiloxane, dimethyldi - n - propyldichlorodisiloxane, tetra-n-propyldichlorodisiloxane, tetraphenyldichlorodisiloxane, diethyldiphenyldichlorodisiloxane, dimethylditolyldichlorodisiloxane, etc.

While any poly-p-carboranylenesiloxanes having the Formula I can be provided according to this invention, preferred embodiments include those poly-p-carboranylenesiloxanes I where $x$ is 2 and R is lower alkyl, i.e., alkyl having 1 to 4 carbon atoms. These polymers have molecular weights of up to about 200,000 and even greater, but poly-p-carboranylenesiloxanes having molecular weights of at least 16,000 are preferred.

While the poly-p-carboranylenesiloxanes I of this invention are readily cured as described hereinafter, the curing process can be aided by incorporating siloxane units bearing vinyl or vinyl-containing substituents on the silicon atom in the polymer backbone. This is accomplished by employing as a co-reactant in the previously described processes a compound such as dichloromethylvinylsilane, dichloro(1-vinylcarboran-2-yl)methylsilane, etc.

The ferric chloride employed as the catalyst in the preparation of the polymers of this invention may be used in its anhydrous form or any of its various hydrated forms, e.g., $FeCl_3 \cdot 6H_2O$; mixtures of hydrated and anhydrous ferric chloride can also be suitably employed. The amount of catalyst can be varied from about 0.01 to about 10 mole percent based on the total number of moles of reactants employed, but preferably from about 0.05 to about 3.0 mole percent is employed.

The preparation of poly-p-carboranylenesiloxanes I is generally carried out at a temperature from about 75° to about 250° C. and preferably from about 90° to about 125° C. If the rate of reaction, as measured by the evolution of gaseous alkyl chloride by-product, decreases prior to completion of the reaction, additional catalyst can be added and/or the temperature increased. Elimination of the ferric chloride catalyst from the polymeric products is accomplished by washing with acetone or a mixture of acetone and concentrated hydrochloric acid.

Surprisingly, poly-p-carboranylenesiloxanes I where $x$ is 2 are plastic, crystalline materials having melting points above 500° C. In contrast, the corresponding meta isomers range in form from liquids to completely rubbery materials. This difference in form between the above-described para and meta polycarboranylenesiloxanes is particularly surprising since it has been found that analogues of compound I, viz. poly-p-carboranylenesiloxanes having the Formula I where $b$ is 4, are elastomeric, rubbery materials like their metal isomers.

Furthermore, the poly-p-carboranylenesiloxanes I where $x$ is 2 are surprisingly resistant to high-temperature oxidation and thermal degradation, thereby rendering them useful in applications where they will be exposed to extremely high temperatures.

Illustrative of the various uses for the poly-p-carboranylenesiloxanes I of this invention is the preparation of composites suitable for use as gaskets, O-rings and bushings in application where high temperature-resistance is required, e.g., aircraft motors and the like.

For example, they are cured by heating under pressure for about 1 to 24 hours or more in the presence of a catalyst. Pressures of from about 200 to 10,000 p.s.i. can be utilized, with pressures from about 500 to 5,000 p.s.i. being preferred. A wide variety of inorganic fillers such as silica fiber, iron oxide, titanium dioxide, etc. can be mixed with the poly-p-carboranylenesiloxanes I in an amount of from about one and one-half to about four times the weight of the polymer. Exemplificative catalysts include organic or inorganic peroxides such as benzoyl peroxide, urea peroxide, dicumyl peroxide, etc. which can be employed in amounts of from about 0.25 percent to about 10.0 percent based on the weight of polymer I.

Thus, a composition prepared from 1 part by weight of the polymeric product of Example 1, 2 parts by weight of silica fiber and 0.1 part by weight of dicumyl peroxide dispersed in calcium carbonate is molded into a disc by pressing the composition at 2,000–3,000 p.s.i. into a two-inch mold, maintaining pressure for 1–2 hours at 150° C. then for 1–2 hours at 200° C. and finally at 400° C. for 2–16 hours. The resulting cured disc is a solid, homogeneous material exhibiting excellent tensile strength, stability and resistance to chemical solvents such as acetone.

The following example will serve to illustrate the practice of this invention.

EXAMPLE 1

A. Preparation of precursors

A mixture of m-carborane and p-carborane, prepared by vapor phase isomerization of o-carborane in accordance with the procedure described by S. Papetti et al. in I. & E. C. Product Research and Development 5, 334–337 (1966), was separated by elution chromatography over basic alumina. Butyllithium (0.6098 mole) in hexane was added with ice cooling to a solution of p-carborane (40.0 g., 0.2772 mole) in 150 ml. of dry ether. The dilithio-p-carborane precipitated and was filtered, washed twice with hexane, and redissolved in 400 ml. of ether. This solution was slowly added at ice temperature to dichlorodimethylsilane (78.725 g.; 0.6098 mole) in 200 ml. of ether. The reaction mixture was then stirred at room temperature for two hours and filtered. The filtrate was evaporated to dryness and the residue sublimed under vacuum at a bath temperature of 125–130° C. Recrystallization of the sublimate from petroleum ether (30–60° C.) provided a solid material, M.P. 183–185° C. The following analytical data revealed that 1,12-bis(chlorodimethylsilyl)-p-carborane had been obtained.

*Analysis.*—Calcd. for $C_6H_{22}B_{10}Cl_2Si_2$: C, 21.84; H, 6.86; B, 32.76; Cl, 21.49. Found: C, 22.11; H, 6.83; B, 32.62; Cl, 21.54.

A 19.0 g. portion of the 1,12-bis(chlorodimethylsilyl)-p-carborane was dissolved in 100 ml. of methanol. The resulting solution was stirred at room temperature for two hours and then evaporated to dryness. Sublimation of the residue under reduced pressure provided a solid product, M.P. 59–60° C. The following analytical data revealed that 1,12-bis(methoxydimethylsilyl)-p-carborane had been obtained.

*Analysis.*—Calcd. for $C_8H_{28}B_{10}O_2Si_2$: C, 29.96; H, 8.80; B, 33.74. Found: C, 30.09; H, 8.79; B, 33.73.

B. Preparation of novel polymer

A portion (7.3990 g., 0.231 mole) of the 1,12-bis-(methoxydimethylsilyl)-p-carborane was mixed with dimethyldichlorosilane (2.9822 g., 0.0231 mole) and two mole percent of a 1:1 mixture of $FeCl_3 \cdot 6H_2O$ and anhydrous ferric chloride (based on the total number of moles of starting materials) in a 100 ml. single-necked flask, which was equipped with a stirring bar and a nitrogen inlet line for flushing the apparatus. The reaction flask was also connected to a vacuum line having a bubble-off and an outlet for sampling volatile products. A wet test meter was connected to the bubble-off to measure methyl chloride evolution. The flask was placed on an oil bath and gradually heated to 180–185° C. When the viscosity of the reaction mixture appeared to substantially increase, another 1 mole percent of the ferric chloride catalyst mixture was added and the heating continued. Within a few minutes the reaction mixture foamed and then solidified. After heating at 180–185° C. for an additional 50 minutes, the product was cut up and washed first with an acetone-concentrated hydrochloric acid mixture and then with acetone in a blender to eliminate the catalyst. A melting point determination was attempted using apparatus measuring melting points up to 500° C.; the product did not melt over this temperature range. The insolubility of the product in such common organic solvents as o-dichlorobenzene acetone, etc. indicated that it had a molecular weight of at least 16,000. Thermogravimetric analysis of a sample of the product revealed a weight loss of 0.63 percent at 650° C. A differential scanning calorimetric determination in air on another sample of the product revealed that it undergoes exothermic oxidation above 370° C. Infrared analysis and the following analytical data revealed that a poly-p-carboranylenesiloxane consisting of recurring units having the following formula had ben obtained.

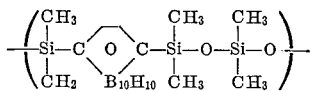

*Analysis.*—Calcd. for $C_8H_{28}B_{10}O_2Si_3$: C, 27.55; H, 8.09; B, 31.02; Si, 24.16. Found: C, 26.20; H, 7.45; B, 35.35; Si, 23.63.

Comparative example 1

Following the procedure of Example 1, equimolar amounts of 1,7-bis(methoxydimethylsilyl)-m-carborane and dichlorodimethylsilane were reacted in the presence of two mole percent of 1:1 mixture of $FeCl_3 \cdot 6H_2O$ and anhydrous ferric chloride. After about 30 minutes, cessation of evolution of methyl chloride by-product indicated that the reaction had ceased. A second one mole percent portion of ferric chloride catalsyt was added and the reaction mixture heated at a temperature of 180–185° C. until the reaction had run to completion as established by the total amount of gas evolved. The resulting product was a rubbery material which was insoluble in the common organic solvents. Infrared analysis revealed that the product consisted of recurring units having the formula

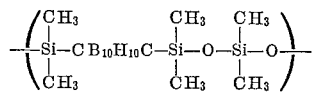

Thermogravimetric analysis of a sample of this poly-m-carboranylenesiloxane revealed a weight loss of 23.2 percent at 650° C., in contrast to the previously reported loss of 0.63 percent for the poly-p-carboranylenesiloxane of Example 1. A differential scanning calorimetric determination in air revealed that this material undergoes exothermic oxidation beginning at 335° C.

What is claimed is:

1. A poly-p-carboranylenesiloxane comprising recurring units having the formula

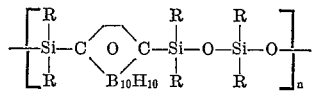

wherein each R is an independently selected alkyl having 1 to 4 carbon atoms and $n$ is an integer greater than 1.

2. The poly-p-carboranylenesiloxane of claim 1 having a molecular weight of at least about 16,000.

3. The poly-p-carboranylenesiloxane of claim 2 wherein R is methyl.

References Cited
UNITED STATES PATENTS 3,355,478 11/1967 Fein et al. _____ 260—46.5
3,366,656 1/1968 Papetti _____ 260—448.2

DONALD E. CZAJA, Primary Examiner

M. I. MARQUIS, Assistant Examiner

U.S. Cl. X.R.

260—2, 448.2, 606.5